(12) United States Patent
Taylor

(10) Patent No.: US 7,552,937 B1
(45) Date of Patent: Jun. 30, 2009

(54) SHOCK-ABSORBING ADAPTER FOR CONNECTING FIFTH WHEEL OR GOOSENECK TRAILER TO TOWING VEHICLE

(76) Inventor: Shelton Taylor, 145 Seaborn Rd., Ponder, TX (US) 76259

( * ) Notice: Subject to any disclaimer, the term of this patent is extended or adjusted under 35 U.S.C. 154(b) by 575 days.

(21) Appl. No.: 11/454,432

(22) Filed: Jun. 16, 2006

(51) Int. Cl.
*B62D 53/06* (2006.01)
*B62D 53/08* (2006.01)

(52) U.S. Cl. .................. 280/439; 280/433; 280/440
(58) Field of Classification Search ............... 280/433, 280/434, 438.1, 439, 440, 441.2
See application file for complete search history.

(56) References Cited

U.S. PATENT DOCUMENTS

| | | | |
|---|---|---|---|
| 1,380,490 A * | 6/1921 | Masury | ............... 280/439 |
| 1,780,531 A | 11/1930 | Messier | |
| 2,150,269 A | 3/1939 | Dreisbach | |
| 2,733,931 A | 2/1956 | Reid et al. | |
| 2,968,496 A | 1/1961 | Gouirand | |
| 3,092,399 A * | 6/1963 | Hair | ............... 280/438.1 |
| 3,137,515 A | 6/1964 | Masser | |
| 3,203,723 A | 8/1965 | Montenare | |
| 3,208,770 A | 9/1965 | Frietas et al. | |
| 3,227,470 A | 1/1966 | Funk | |
| 3,236,541 A | 2/1966 | Poteet | |
| 3,269,751 A | 8/1966 | Whattoff | |
| 3,380,758 A | 4/1968 | Granning | |
| 3,400,949 A | 9/1968 | Kendall | |
| 3,426,377 A | 2/1969 | Beckwith et al. | |
| 3,708,183 A | 1/1973 | Jones | |
| 3,717,273 A * | 2/1973 | Berends | ............... 280/425.1 |
| 3,865,406 A | 2/1975 | Dutton | |
| 4,057,265 A | 11/1977 | Grace | |
| 4,137,587 A | 2/1979 | Rosengren | |
| 4,148,498 A | 4/1979 | Taylor, Jr. | |
| 4,153,270 A | 5/1979 | Brockmiller | |
| 4,215,876 A | 8/1980 | Jacks | |
| 4,373,847 A | 2/1983 | Hipp et al. | |
| 4,564,209 A | 1/1986 | Kingsley et al. | |
| 4,580,806 A | 4/1986 | Kolstad et al. | |
| 4,632,371 A | 12/1986 | Wirges et al. | |
| 5,209,316 A | 5/1993 | Bauer | |
| 5,226,675 A | 7/1993 | Noah et al. | |
| 5,388,849 A * | 2/1995 | Arsenault et al. | ......... 280/425.1 |
| 5,413,366 A | 5/1995 | Gibbons | |
| 5,427,471 A | 6/1995 | Godbersen | |
| 5,503,423 A | 4/1996 | Roberts et al. | |
| 5,639,106 A | 6/1997 | Vitale et al. | |
| 5,695,204 A | 12/1997 | Ford | |
| 5,704,086 A | 1/1998 | Hansen et al. | |
| 5,823,560 A | 10/1998 | Van Vleet | |
| 5,836,603 A | 11/1998 | Logan et al. | |
| 6,116,631 A | 9/2000 | Logan et al. | |

(Continued)

*Primary Examiner*—Paul N Dickson
*Assistant Examiner*—Marc A Scharich
(74) *Attorney, Agent, or Firm*—Donald R. Schoonover

(57) ABSTRACT

A shock-absorbing adapter for connecting a fifth wheel or gooseneck trailer to a towing vehicle including a lower plate, an upper plate, first and second guide means, cushioning means, a first coupling mechanism for releasably connecting the lower plate to the towing vehicle, and a second coupling mechanism for releasably connecting the upper plate to the fifth wheel or gooseneck trailer. The upper plate is operably displaceable relative to the lower plate to thereby compress the cushioning means and responsively cushion relative movements between the first coupling mechanism and the second coupling mechanism.

13 Claims, 1 Drawing Sheet

U.S. PATENT DOCUMENTS

| | | |
|---|---|---|
| 6,170,849 B1 | 1/2001 | McCall |
| 6,170,852 B1 | 1/2001 | Kimbrough |
| 6,581,951 B2 * | 6/2003 | Lange ......................... 280/440 |
| 6,746,037 B1 | 6/2004 | Kaplenski et al. |

* cited by examiner

SHOCK-ABSORBING ADAPTER FOR CONNECTING FIFTH WHEEL OR GOOSENECK TRAILER TO TOWING VEHICLE

BACKGROUND OF THE INVENTION

1. Field of the Invention

The present invention relates to accessories for towing a vehicle with another vehicle and, more specifically without limitation, to accessories for towing a fifth wheel or gooseneck trailer.

2. Description of the Related Art

A fifth wheel-type or gooseneck trailer is pivotally connected to another vehicle for towing purposes. The trailer may include a king pin for releasable connection to a fifth wheel hitch ball mounted on the towing vehicle. Alternatively, the trailer may include a fifth wheel hitch ball for releasable connection to a king pin mounted on the towing vehicle. When the trailer or towing vehicle hits a bump or depression or either vehicle attempts to accelerate or decelerate relative to the other vehicle, the towing vehicle and trailer lurch back and forth, buffeting each other. Not only is that situation aggravating, annoying and uncomfortable, it could cause substantial wear and tear on both the trailer and the towing vehicle and is potentially dangerous. Various shock-absorbing fifth wheel hitches have been developed and already exist in an attempt to alleviate this undesirable situation. However, there is room for further improvement for an effective means for alleviating the undesirable buffeting that occurs between a fifth-wheel or gooseneck trailer and a vehicle towing the trailer.

What is needed is an improved shock-absorbing adapter for connecting a fifth-wheel or gooseneck trailer to a towing vehicle.

SUMMARY OF THE INVENTION

The improvements of the present invention for a shock-absorbing adapter for connecting a fifth wheel or gooseneck trailer having either a king pin or a fifth-wheel hitch ball to a towing vehicle having the other of a fifth-wheel hitch ball or a king pin. The adapter includes a lower plate, an upper plate, first and second guide means, cushioning means, and first and second coupling means.

The lower plate includes a first end, a second end, an upper surface, and a lower surface. The upper plate includes a first end, a second end, an upper surface, and a lower surface.

The first guide means includes a cylindrically shaped center post fixedly secured to the lower plate wherein the center post has a longitudinal axis and an outer diameter. The center post is spaced centrally between the first and second ends of the lower plate and extends perpendicularly upward from the upper surface of the lower plate. The first guide means also includes a pair of cylindrically shaped first and second end posts fixedly secured to a respective one of the first and second ends of the lower plate. Each of the first and second end posts has a longitudinal axis and an outer diameter and extends perpendicularly upward from the upper surface of the lower plate.

The second guide means includes a center receiver including a cylindrically shaped center element fixedly secured to the upper plate. The center element has a longitudinal axis which is concentric with the longitudinal axis of the center post and an inner diameter with a magnitude which is slightly greater than the magnitude of the outer diameter of the center post. The center element is spaced centrally between the first and second ends of the upper plate wherein the center receiver is operably slidable longitudinally relative to the center post. The second guide means also includes a pair of end receivers, each including a cylindrically shaped end element fixedly secured to the upper plate. Each of the end elements has an inner diameter with a magnitude which is slightly greater than the magnitude of the outer diameter of a respective one of the first and second end posts and a longitudinal axis which is concentric with the longitudinal axis of a respective one of the first and second end posts wherein the first and second end receivers are operably slidable longitudinally relative to the first and second end posts. Each of the first and second end posts further includes a head having a horizontal dimension that is greater in magnitude than the inner diameter of a respective one of the first and second end receivers thereby capturing the upper plate about the first and second end posts.

The cushioning means includes first and second cushion mechanisms. The first cushion mechanism includes an upper end fixedly secured to the lower surface of the upper plate and a lower end fixedly secured to the upper surface of the lower plate. The first cushion mechanism is spaced approximately centrally between the first end post and the center post and includes at least one air bag. The second cushion mechanism includes an upper end fixedly secured to the lower surface of the upper plate and a lower end fixedly secured to the upper surface of the lower plate. The second cushion mechanism is spaced approximately centrally between the second end post and the center post and includes at least one air bag.

The first coupling mechanism is fixedly secured to the lower surface of the lower plate and is structured and configured to be releasably connectable to either a fifth-wheel hitch ball or a king pin as appropriate of the towing vehicle. The second coupling mechanism is fixedly secured to the upper surface of the upper plate and is structured and configured to be releasably connectable to the other of a king pin or a fifth-wheel hitch ball as appropriate of the fifth wheel or gooseneck trailer.

The shock-absorbing adapter of the present invention is structured and configured wherein the upper plate is operably displaceable relative to the lower plate to thereby compress the cushioning means and to responsively cushion relative movements between the first coupling mechanism connected to the towing vehicle and the second coupling mechanism connected to the fifth wheel or gooseneck trailer.

PRINCIPAL OBJECTS AND ADVANTAGES OF THE INVENTION

The principal objects and advantages of the present invention include: providing an improved shock-absorbing adapter for connecting a fifth-wheel or gooseneck trailer to a towing vehicle; providing such an adapter that connects a kingpin of a fifth-wheel or gooseneck trailer to a fifth-wheel hitch ball of a towing vehicle; providing such an adapter that connects a fifth-wheel hitch ball of a fifth-wheel or gooseneck trailer to a king pin of a towing vehicle; and generally providing such an adapter that is reliable in performance, capable of long-lasting life, and particularly well adapted for the proposed usages thereof.

Other objects and advantages of this invention will become apparent from the following description taken in conjunction

DETAILED DESCRIPTION OF THE INVENTION

As required, embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

Figure 1:
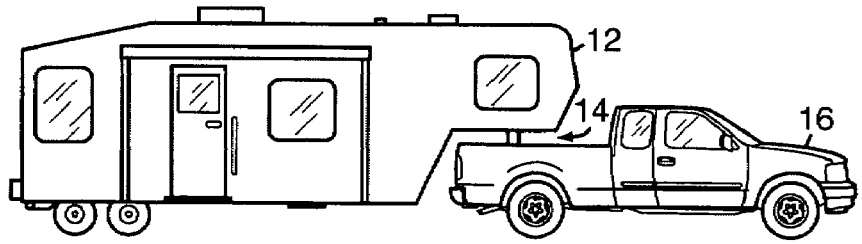
FIG. 1 is side elevational view of a shock-absorbing adapter for connecting a fifth-wheel or gooseneck trailer to a towing vehicle in use, according to the present invention.
Figure 2:
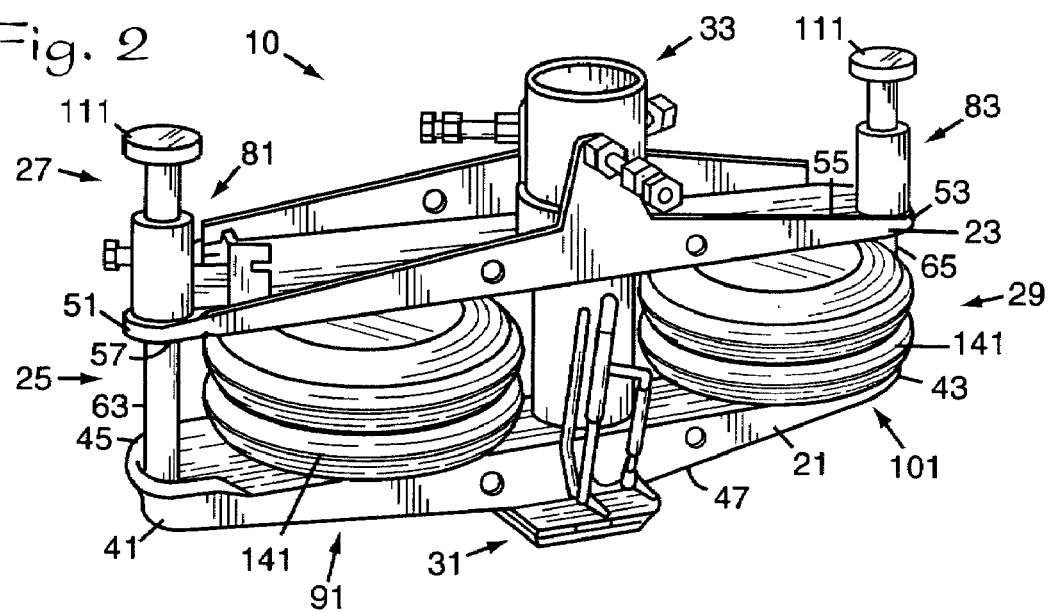
FIG. 2 is an enlarged and perspective view of the shock-absorbing adapter for connecting a fifth-wheel or gooseneck trailer to a towing vehicle.
Figure 3:
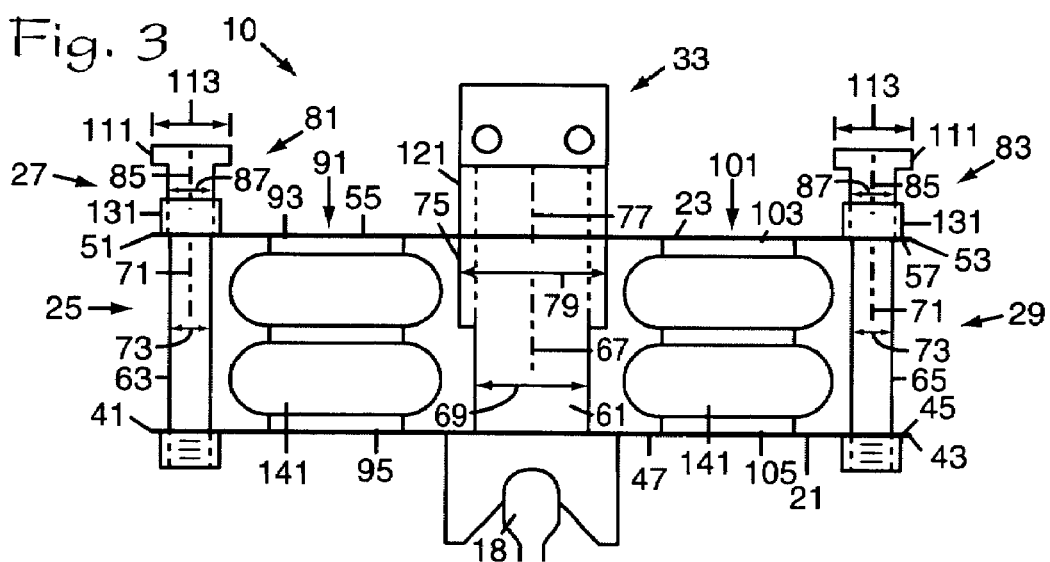
FIG. 3 is an enlarged and schematic representation of a cross-sectional view of the shock-absorbing adapter for connecting a fifth-wheel or gooseneck trailer to a towing vehicle, according to the present invention.

The reference numeral 10 generally refers to a shock-absorbing adapter for connecting a fifth wheel or gooseneck trailer 12 having a king pin 14 to a towing vehicle 16 having a fifth-wheel hitch ball 18 in accordance with the present invention, as shown in FIGS. 1 through 3. The shock-absorbing adapter 10 includes a lower plate 21, an upper plate 23, a first guide means 25, a second guide means 27, cushioning means 29, a first coupling mechanism 31, and a second coupling mechanism 33.

The lower plate 21 includes a first end 41, a second end 43, an upper surface 45, and a lower surface 47.

The upper plate 23 includes a first end 51, a second end 53, an upper surface 55, and a lower surface 57.

The first guide means 25 includes a cylindrically shaped center post 61 fixedly secured to the lower plate 21 and a pair of cylindrically shaped first and second end posts 63, 65 fixedly secured to a respective one of the first and second ends 41, 43 of the lower plate 21. The center post 61 includes a longitudinal axis 67 and an outer diameter 69. The center post 61 is spaced centrally between the first and second ends 41, 43 of the lower plate 21 and extends perpendicularly upward from the upper surface 45 of the lower plate 21. Each of the first and second end posts 63, 65 includes a longitudinal axis 71, an outer diameter 73, and extends perpendicularly upward from the upper surface 45 of the lower plate 21.

The second guide means 27 includes a circularly shaped center receiver 75 having a longitudinal axis 77 and an inner diameter 79 that is slightly larger than the outer diameter 69 of the center post 61. The second guide means 27 also includes a pair of circularly shaped first and second end receivers 81, 83, each having a longitudinal axis 85 and an inner diameter 87 that is slightly larger than the outer diameter 73 of the respective first and second end posts 63, 65. Each of the first and second end posts 63, 65 is spaced near a respective one of the first and second ends 51, 53 of the upper plate 23.

The center receiver 75 is spaced approximately centrally between the first and second ends 51, 53 of the upper plate 23 with the longitudinal axis 77 of the center receiver 75 being concentric with the longitudinal axis 67 of the center post 61 wherein the center receiver 75 is operably slidable longitudinally relative to the center post 61.

The longitudinal axis 85 of each of the first and second end receivers 81, 83 is concentric with the longitudinal axis 71 of a respective one of the first and second end posts 63, 65 wherein the first and second end receivers 81, 83 are operably slidable longitudinally relative to the first and second end posts 63, 65.

The cushioning means 29 includes a first cushion mechanism 91 having an upper end 93 fixedly secured to the lower surface 57 of the upper plate 23 and a lower end 95 fixedly secured to the upper surface 45 of the lower plate 21. The first cushion mechanism 91 is spaced approximately centrally between the first end post 63 and the center post 61.

The cushioning means 29 also includes a second cushion mechanism 101 having an upper end 103 fixedly secured to the lower surface 57 of the upper plate 23 and a lower end 105 fixedly secured to the upper surface 45 of the lower plate 21. The second cushion mechanism 101 is spaced approximately centrally between the second end post 65 and the center post 61.

The first coupling mechanism 31 is fixedly secured to the lower surface 47 of the lower plate 21 and is structured and configured to be releasably connectable to the fifth wheel hitch ball 18 of the towing vehicle 16.

The second coupling mechanism 33 is fixedly secured to the upper surface 55 of the upper plate 23 and is structured and configured to be releasably connectable to the king pin 14 of the fifth wheel trailer 12.

The shock-absorbing adapter 10 is structured and configured wherein the upper plate 23 is operably displaceable relative to the lower plate 21 to thereby compress the cushioning means 29 and responsively cushion relative movements between the first coupling mechanism 31 connected to the fifth wheel hitch ball 18 of the towing vehicle 16 and the second coupling mechanism 33 connected to the king pin 14 of the fifth wheel trailer 12.

Preferably, each of the first and second end posts 63, 65 includes a head 111 having a horizontal dimension 113 that is greater in magnitude than the inner diameter 87 of a respective one of the first and second end receivers 81, 83, thereby capturing the upper plate 23 about the first and second end posts 63, 65.

For some applications, it may be desirable that the center receiver 75 includes a cylindrically shaped center element 121 fixedly secured to the upper plate 23 wherein the center element 121 has the inner diameter 79 and the longitudinal axis 77.

It may also be desirable that each of the first and second end receivers 81, 83 includes a cylindrically shaped end element 131 fixedly secured to the upper plate 23 wherein each end element 131 has the inner diameter 87 and the longitudinal axis 85.

Each of the first and second cushion mechanisms 31, 33 may includes at least one air bag 141.

For applications wherein the adapter 10 of the present invention is being used for connecting a fifth wheel trailer 12 having a fifth-wheel hitch ball 18 to a towing vehicle 16 having a king pin 14, the first coupling mechanism 31 is fixedly secured to the upper surface 55 of the upper plate 23 and is structured and configured to be releasably connectable to the fifth-wheel hitch ball 18 of the fifth wheel trailer 12, and the second coupling mechanism 33 is fixedly secured to the lower surface 47 of the lower plate 21 and is structured and configured to be releasably connectable to the king pin 14 of the towing vehicle.

It is foreseen that an application of the present invention may require connection of a fifth wheel or gooseneck trailer 12 having a king pin to a towing vehicle 16 also having a king pin. In that event, the first coupling mechanism 31 is structured and configured to be releasably connectable to the king pin of the towing vehicle 16, and the second coupling mechanism 33 is structured and configured to be releasably connectable to the king pin of the fifth-wheel or gooseneck trailer 12.

It is also foreseen that an application of the present invention may require connection of a fifth wheel or gooseneck trailer 12 having a fifth-wheel hitch ball to a towing vehicle 16 also having a fifth-wheel hitch ball. In that event, the first coupling mechanism 31 is structured and configured to be releasably connectable to the fifth-wheel hitch ball of the towing vehicle 16, and the second coupling mechanism 33 is structured and configured to be releasably connectable to the fifth-wheel hitch ball of the fifth-wheel or gooseneck trailer 12.

In an application of the present invention, the first coupling mechanism 31 is releasably connected to the towing vehicle 16 and the fifth wheel or gooseneck trailer 12 is releasably connected to the second coupling mechanism 33. The fifth wheel or gooseneck trailer 12 is then towed behind the towing vehicle 16 in the usual manner with the upper plate 23 of the present invention 10 being operably displaced relative to the lower plate 21 thereby compressing the cushioning means 29 which responsively cushions the relative movements between the first and second coupling mechanisms 31, 33.

It is to be understood that while certain forms of the present invention have been illustrated and described herein, it is not to be limited to the specific forms or arrangement of parts as described and shown.

What is claimed and desired to be covered by Letters Patent is as follows:

1. A shock-absorbing adapter for connecting a fifth wheel or gooseneck trailer to a towing vehicle, the adapter comprising:
    (a) a lower plate having a first end, a second end, an upper surface, and a lower surface;
    (b) an upper plate having a first end, a second end, an upper surface, and a lower surface;
    (c) a first guide means including:
        (1) a cylindrically shaped center post fixedly secured to the upper surface of the lower plate, the center post having a longitudinal axis and an outer diameter and being spaced centrally between the first and second ends of the lower plate and extending perpendicularly upward from the upper surface of the lower plate, and
        (2) a pair of cylindrically shaped first and second end posts fixedly secured to the upper surface of a respective one of the first and second ends of the lower plate, each of the first and second end posts extending perpendicularly upward from the upper surface of the lower plate;
    (d) a second guide means including:
        (1) a circularly shaped center receiver having a longitudinal axis and an inner diameter with a magnitude which is slightly greater than a magnitude of the outer diameter of the center post, the center receiver being spaced centrally between the first and second ends of the upper plate, the longitudinal axis of the center receiver being concentric with the longitudinal axis of the center post, wherein the center receiver is operably slidable longitudinally relative to the center post, and
        (2) a pair of circularly shaped first and second end receivers, each having a longitudinal axis and an inner diameter with a magnitude which is slightly greater than a magnitude of an outer diameter of a respective one of the first and second end posts, and each of the first and second end receivers being spaced near a respective one of the first and second ends of the upper plate, the longitudinal axis of each of the first and second end receivers being concentric with a longitudinal axis of a respective one of the first and second end posts, wherein the first and second end receivers are operably slidable longitudinally relative to the first and second end posts;
    (e) a cushioning means including:
        (1) a first cushion mechanism having an upper end fixedly secured to the lower surface of the upper plate and a lower end fixedly secured to the upper surface of the lower plate, the first cushion mechanism being spaced approximately centrally between the first end post and the center post, and
        (2) a second cushion mechanism having an upper end fixedly secured to the lower surface of the upper plate and a lower end fixedly secured to the upper surface of the lower plate, the second cushion mechanism being spaced approximately centrally between the second end post and the center post;
    (f) a first coupling mechanism fixedly secured to the lower surface of the lower plate, the first coupling mechanism being structured and configured to be releasably connectable to the towing vehicle; and
    (g) a second coupling mechanism fixedly secured to the upper surface of the upper plate, the second coupling mechanism being structured and configured to be releasably connectable to the fifth wheel or gooseneck trailer; and
    (h) wherein the upper plate is operably displaceable relative to the lower plate to thereby compress the cushioning means and responsively cushion relative movements between the first and second coupling mechanisms.

2. A shock-absorbing adapter as described in claim 1, wherein:
    (a) the first coupling mechanism is structured and configured to be releasably connectable to a fifth-wheel ball hitch of the towing vehicle; and
    (b) the second coupling mechanism is structured and configured to be releasably connectable to a king pin of the fifth-wheel or gooseneck trailer.

3. A shock-absorbing adapter as described in claim 2, wherein each of the first and second end posts includes a head having a horizontal dimension with a magnitude which is greater than the magnitude of the inner diameter of a respective one of the first and second end receivers thereby capturing the upper plate about the first and second end posts.

4. A shock-absorbing adapter as described in claim 2, wherein the center receiver includes a cylindrically shaped center element fixedly secured to the upper plate, the center element having the same inner diameter and longitudinal axis of the center receiver.

5. A shock-absorbing adapter as described in claim 2, wherein each of the first and second end receivers includes a cylindrically shaped end element fixedly secured to the upper plate, each end element having the same inner diameter and longitudinal axis of a respective one of the first and second end receivers.

6. A shock-absorbing adapter as described in claim 2, wherein each of the first and second cushion mechanisms includes at least one air bag.

7. A shock-absorbing adapter as described in claim 1, wherein:

(a) the first coupling mechanism is structured and configured to be releasably connectable to a king pin of the towing vehicle; and (b) the second coupling mechanism is structured and configured to be releasably connectable to a fifth-wheel hitch ball of the fifth-wheel or gooseneck trailer.

8. A shock-absorbing adapter as described in claim 7, wherein each of the first and second end posts includes a head having a horizontal dimension with a magnitude which is greater than the magnitude of the inner diameter of a respective one of the first and second end receivers thereby capturing the upper plate about the first and second end posts.

9. A shock-absorbing adapter as described in claim 7, wherein the center receiver includes a cylindrically shaped center element fixedly secured to the upper plate, the center element having the same inner diameter and longitudinal axis of the center receiver.

10. A shock-absorbing adapter as described in claim 7, wherein each of the first and second end receivers includes a cylindrically shaped end element fixedly secured to the upper plate, each end element having the same inner diameter and longitudinal axis of a respective one of the first and second end receivers.

11. A shock-absorbing adapter as described in claim 7, wherein each of the first and second cushion mechanisms includes at least one air bag.

12. A shock-absorbing adapter for connecting a fifth wheel or gooseneck trailer having a king pin to a towing vehicle having a fifth-wheel hitch ball, the adapter comprising:

(a) a lower plate having a first end, a second end, an upper surface, and a lower surface;

(b) an upper plate having a first end, a second end, an upper surface, and a lower surface;

(c) a first guide means including:
  (1) a cylindrically shaped center post fixedly secured to the upper surface of the lower plate, the center post having a longitudinal axis and an outer diameter, the center post being spaced centrally between the first and second ends of the lower plate and extending perpendicularly upward from the upper surface of the lower plate, and
  (2) a pair of cylindrically shaped first and second end posts fixedly secured to a respective one of the first and second ends of the lower plate, each of the first and second end posts having a longitudinal axis and an outer diameter and extending perpendicularly upward from the upper surface of the lower plate;

(d) a second guide means including:
  (1) a center receiver including a cylindrically shaped center element fixedly secured to the upper plate, the center element having a longitudinal axis which is concentric with the longitudinal axis of the center post and an inner diameter with a magnitude that is slightly greater than a magnitude of the outer diameter of the center post, the center element being spaced centrally between the first and second ends of the upper plate, wherein the center receiver is operably slidable longitudinally relative to the center post, and
  (2) a pair of end receivers, each including a cylindrically shaped end element fixedly secured to the upper plate, each of the end elements having a longitudinal axis, which is concentric with the longitudinal axis of a respective one of the first and second end posts, and an inner diameter with a magnitude which is slightly greater than a magnitude of the outer diameter of a respective one of the first and second end posts, wherein the first and second end receivers are operably slidable longitudinally relative to the first and second end posts, each of the first and second end posts further including a head having a horizontal dimension with a magnitude which is greater than the magnitude of the inner diameter of a respective one of the first and second end receivers thereby capturing the upper plate about the first and second end posts;

(e) a cushioning means including:
  (1) a first cushion mechanism having an upper end fixedly secured to the lower surface of the upper plate and a lower end fixedly secured to the upper surface of the lower plate, the first cushion mechanism being spaced approximately centrally between the first end post and the center post, the first cushion mechanism including at least one air bag, and
  (2) a second cushion mechanism having an upper end fixedly secured to the lower surface of the upper plate and a lower end fixedly secured to the upper surface of the lower plate, the second cushion mechanism being spaced approximately centrally between the second end post and the center post, the second cushion mechanism including at least one air bag;

(f) a first coupling mechanism fixedly secured to the lower surface of the lower plate, the first coupling mechanism being structured and configured to be releasably connectable to the fifth-wheel hitch ball of the towing vehicle; and (g) a second coupling mechanism fixedly secured to the upper surface of the upper plate, the second coupling mechanism being structured and configured to be releasably connectable to the king pin of the fifth wheel or gooseneck trailer; and (h) wherein the upper plate is operably displaceable relative to the lower plate to thereby compress the cushioning means and responsively cushion relative movements between the first coupling mechanism connected to the fifth-wheel hitch ball of the towing vehicle and the second coupling mechanism connected to the king pin of the fifth wheel or gooseneck trailer.

13. A shock-absorbing adapter for connecting a fifth wheel or gooseneck trailer having a fifth-wheel hitch ball to a towing vehicle having a king pin, the adapter comprising:

(a) a lower plate having a first end, a second end, an upper surface, and a lower surface;

(b) an upper plate having a first end, a second end, an upper surface, and a lower surface;

(c) a first guide means including:
  (1) a cylindrically shaped center post fixedly secured to the upper surface of the lower plate, the center post having a longitudinal axis and an outer diameter, the center post being spaced centrally between the first and second ends of the lower plate and extending perpendicularly upward from the upper surface of the lower plate, and
  (2) a pair of cylindrically shaped first and second end posts fixedly secured to a respective one of the first and second ends of the lower plate, each of the first and second end posts having a longitudinal axis and an outer diameter and extending perpendicularly upward from the upper surface of the lower plate;

(d) a second guide means including:
  (1) a center receiver including a cylindrically shaped center element fixedly secured to the upper plate, the center element having a longitudinal axis which is concentric with the longitudinal axis of the center post and an inner diameter with a magnitude that is slightly greater than a magnitude of the outer diameter of the center post, the center element being spaced centrally between the first and second ends of the upper plate, wherein the center receiver is operably slidable longitudinally relative to the center post, and (2) a pair of end receivers, each including a cylindrically shaped end element fixedly secured to the upper plate, each of the end elements having a longitudinal axis, which is concentric with the longitudinal axis of a respective one of the first and second end posts, and an inner diameter with a magnitude which is slightly larger than the outer diameter of a respective one of the first and second end posts, wherein the first and second end receivers are operably slidable longitudinally relative to the first and second end posts, each of the first and second end posts further including a head having a horizontal dimension with a magnitude which is greater than the magnitude of the inner diameter of a respective one of the first and second end receivers thereby capturing the upper plate about the first and second end posts;

(e) a cushioning means including:

(1) a first cushion mechanism having an upper end fixedly secured to the lower surface of the upper plate and a lower end fixedly secured to the upper surface of the lower plate, the first cushion mechanism being spaced approximately centrally between the first end post and the center post, the first cushion mechanism including at least one air bag, and (2) a second cushion mechanism having an upper end fixedly secured to the lower surface of the upper plate and a lower end fixedly secured to the upper surface of the lower plate, the second cushion mechanism being spaced approximately centrally between the second end post and the center post, the second cushion mechanism including at least one air bag;

(f) a first coupling mechanism fixedly secured to the lower surface of the lower plate, the first coupling mechanism being structured and configured to be releasably connectable to the king pin of the towing vehicle; and (g) a second coupling mechanism fixedly secured to the upper surface of the upper plate, the second coupling mechanism being structured and configured to be releasably connectable to the fifth-wheel hitch ball of the fifth wheel or gooseneck trailer; and (h) wherein the upper plate is operably displaceable relative to the lower plate to thereby compress the cushioning means and responsively cushion relative movements between the first coupling mechanism connected to the king pin of the towing vehicle and the second coupling mechanism connected to the fifth-wheel hitch ball of the fifth wheel or gooseneck trailer.

* * * * *